United States Patent [11] 3,536,157

| [72] | Inventor | Nigel Allister Anstey<br>Orpington, Kent, England |
|---|---|---|
| [21] | Appl. No. | 788,784 |
| [22] | Filed | Jan. 3, 1969 |
| [45] | Patented | Oct. 27, 1970 |
| [73] | Assignee | Seismograph Service Corporation<br>Tulsa, Oklahoma |
| [32] | Priority | Jan. 3, 1968 |
| [33] | | Great Britain |
| [31] | | 388/68 |

[54] UNDERWATER SOUND SOURCES
18 Claims, 4 Drawing Figs.

[52] U.S. Cl............................................... 181/0.5,
116/27, 116/137, 340/7, 340/12
[51] Int. Cl..................................................... B63b 45/08,
G10k 10/00
[50] Field of Search.......................................... 116/27;
340/7, 12; 181/.5(A)

[56] References Cited
UNITED STATES PATENTS

| 2,792,804 | 5/1957 | Bouyoucos et al............ | 116/27X |
| 3,286,225 | 11/1966 | Huckabay et al............. | 340/7 |
| 3,376,949 | 4/1968 | Baker et al.................... | 181/.5 |

Primary Examiner—Ricahrd A. Farley
Assistant Examiner—Daniel C. Kaufman
Attorney—Mason, Kolehmainen, Rathburn & Wyss ABSTRACT: A sound source for generating underwater acoustic pulses comprises an open-ended pipe which is provided at one or both of its ends with a velocity transformer, such that when the pipe moves through water beneath the surface thereof the water flows through the pipe at a speed greater than the speed of the sound source through the water. The sound source includes a valve or other cutoff means for suddenly interrupting the flow of water to produce an acoustic signal which is radiated from the sound source.

INVENTOR:
NIGEL A. ANSTEY

Patented Oct. 27, 1970 3,536,157

INVENTOR:
NIGEL A ANSTEY
by
Mason, Kolehmainen, Rathburn, & Wyss
ATTORNEYS

UNDERWATER SOUND SOURCES

This invention relates to methods of and apparatus for generating underwater acoustic pulses; it is particularly concerned with sound sources for use in underwater seismic exploration.

The conventional sound source which is generally used for such seismic exploration is an explosive charge. This may be in a concentrated form, in order to provide a point source for the sound waves which are produced by the explosion of the charge. Alternatively the charge may be in a linerally distributed form, in order to provide the benefits of an array of sound sources or of a long single sound source. The use of explosive charges to provide underwater sound sources does, however, involve certain limitations and disadvantages and many efforts have been and are being made to provide mechanical sound sources which avoid, or at least reduce, these disadvantages. Such mechanical sources may take the form of hydraulic vibrators, to give one example, or pistons or the like may be used, operated hydraulically or by other means.

The mechanical sound sources which have been proposed, however, have had to be equipped with their own sources of energy. This energy might be obtained from a specially provided internal combustion engine, for example, or piston-type sources might be used which are operated by chemical fuels (e.g. propane oxygen). The resulting installations are, however, complicated and expensive, both in their construction and use.

It is an object of the present invention to provide a nonexplosive sound source for generating underwater acoustic pulses which makes use of the engine power of the survey vessel being used and which obtains the needed power from the movement of the vessel through the water.

A further object of the invention is to provide such a sound source which can be made to produce acoustic pulses the distribution and waveform of which are determined, at least in part, by the design and construction of the sound source.

During a marine seismic survey, the survey vessel normally proceeds at a speed of the order of 6 knots, which is very much below the normal speed of the vessel. There is, therefore, spare power available from the ship's engine during a survey and the present invention provides a method and apparatus which utilise this power to produce the acoustic pulses required. This it does by providing a sound source which, when it is drawn or made to travel through the water by the movement of the vessel, operates on the water-hammer principle. As will appear from the following description, such a sound source can be designed to produce acoustic pulses or signals which have many of the benefits of a line array, whilst the sound sources of the invention offer useful advantages, both practical and economic, over other sound sources, whether explosive or mechanical, which have been proposed or used in the past.

As will be more fully described the sound source of the invention may be designed as a separate unit which is towed behind the survey vessel below the surface of the water. Alternatively, however, it could be built into the structure of the survey vessel itself or it might form part of, or be suspended below, a smaller boat or raft assembly which is intended to be towed by the survey vessel.

Whatever the arrangement may be, however, it is a feature of the present invention that it is the movement of the sound source through the water which is used to provide the power which is needed by the sound source in order to produce the required acoustic pulses or signals.

For the better understanding of the present invention, reference will be made to the accompanying drawings, in which.

Figure 7:
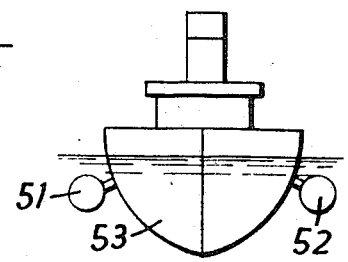
Figure 8:
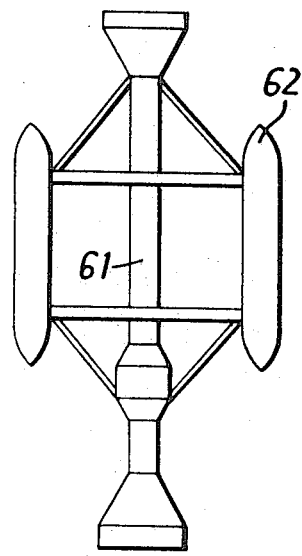
Figure 9:
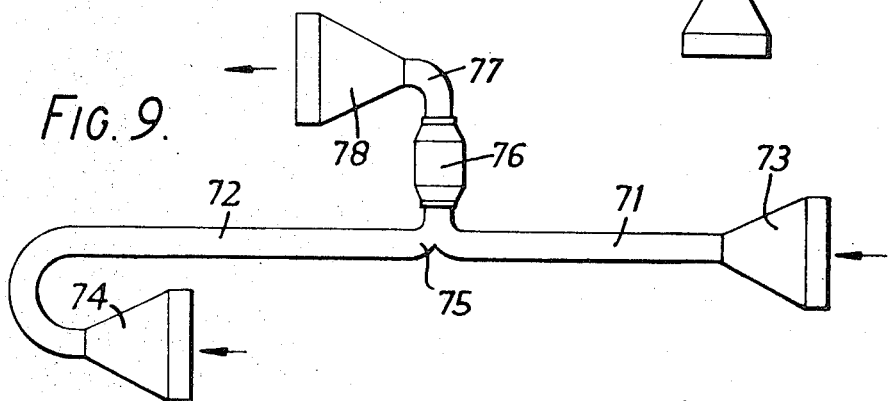

FIGS. 7 and 8 show, purely diagrammatically, ways in which the sound source of the invention might be attached to or form part of the structure of the survey vessel itself or alternatively how it might be attached to a catamaran or other craft which is adapted to be towed behind the survey vessel; and FIG. 9 is a purely diagrammatic view showing yet another way in which the invention might be put into effect.

Figure 1:
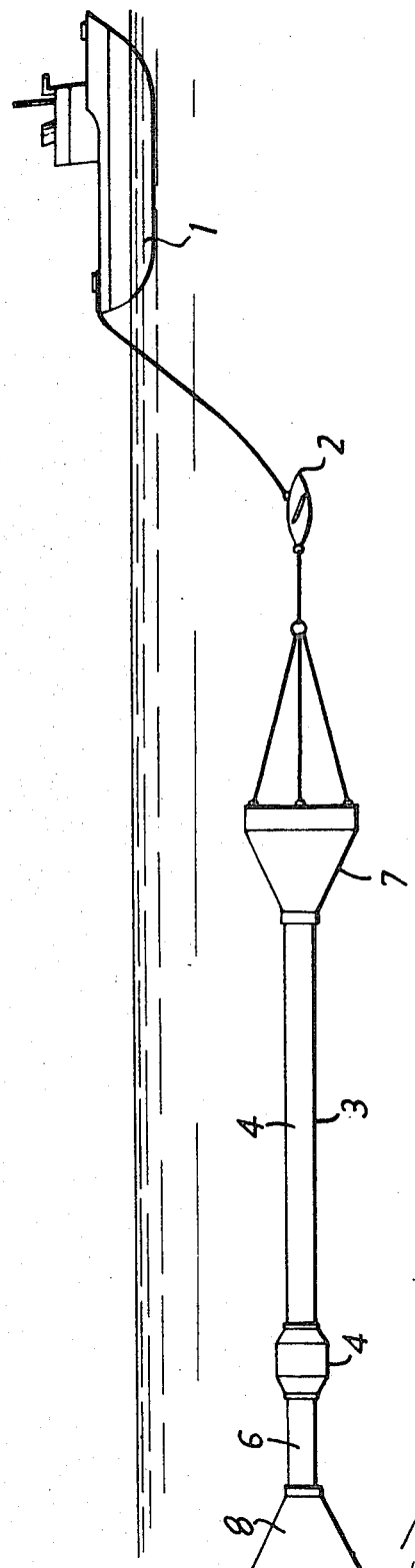
FIG. 1 is a general side view, mostly below the surface of the sea, showing a sound source which exemplifies the invention and which is shown being towed behind a survey vessel, it being noted that this vessel has, for convenience, been shown to a smaller scale than the sound source itself.

Referring first to FIG. 1, this shows a survey vessel 1 which is towing a depressor unit 2, to which latter a sound source, which is indicated generally at 3, is connected. The depressor unit 2, which may be of any suitable type, is designed to keep the sound source 3 at a predetermined depth below the surface whilst the sound source is being towed at the intended surveying speed.

If desired two (or more) sound sources might be used, connected with the survey vessel, and if desired with each other, in any suitable way.

The source 3 shown in FIG. 1 is in the form of a straight open-ended pipe. It comprises a front pipe section 4, a cutoff valve unit 5 and a rear pipe section 6, which latter is rigidly connected with the section 4 by means of the unit 5. Attached to the front and rear ends of the pipe sections 4 and 6 are two velocity transformers 7 and 8, respectively. These are of a funnel-shape and their shape and dimensions are determined firstly by the surplus power which will be available from the engines of the survey vessel 1 and secondly by acoustic and strength considerations.

During a survey the source (or sources) 3 is or are towed behind the vessel 1, this being preferably done at the normal speed which is used for seismic surveying. The source or sources 3 provide a very considerable drag and their number and dimensions are preferably such that the engines of the vessel 1 are operating near their maximum power rating whilst surveying is in progress. The source or sources 3 is or are designed to use a large proportion of the surplus power of the vessel 1 so as to impart a high velocity, and thus energy, to the water flowing through the or each sound source under conditions when the valve 5 in that sound source is open. In a typical case the open end of the funnel forming the front velocity transformer 7 may be several metres in diameter, whilst the diameter of the pipe sections 4 and 6 may be a metre or less. The length of the pipe section 4 may be several tens of metres. The diameter of the pipe section 6 may be similar to that of the section 4, although the section 6 will normally be considerably shorter than the section 4.

With such dimensions as have been given above there will be a large mass of water within the pipe section 4 and this will have a substantial velocity relatively both to the pipe itself and also to the stationary water through which the source is being towed with the valve 5 open.

The valve 5, which may be of any of a number of possible types, some of which will be described later, is normally open, but it is made to close when an acoustic pulse or signal is to be generated. Closure of the valve 5 could be effected solely by the pressure of water in the pipe section 4 or it could be effected or assisted by mechanical or other means. It could, for example, be operated electrically, pneumatically or hydraulically under control from the vessel 1.

In use the sound source 3 is towed by the vessel 1 along the desired course with the valve 5 open. During this time water will travel through the pipe sections 4 and 6, where its speed will be much greater than the speed of the vessel 1. At a desired point a suitable control, which may be operated from the vessel 1 through suitable electrical or other connections (not shown), is operated to cause the valve 5 to close. The closing of the valve will arrest the mass of water in the pipe section 4 and produce, by a water-hammer effect, a return compression pulse or head which will travel back along the pipe section 4 from the valve 5 towards the velocity transformer 7. It is this compression pulse in the pipe which is used to produce a seismic signal.

In one method of applying the invention, the pipe sections 4 and 6 are made of a material (such as metal) which is substantially noncompliant. In this case the compression head or pulse will travel back along the section 4 without appreciable loss. The velocity transformer 7 will then serve the function of an acoustic horn, ensuring that the compression is largely radiated into the surrounding water and is not reflected as a rarefaction back into the pipe section 4. In this way the oscillator characteristics of a water hammer are avoided and in effect a single pulse is obtained from the mouth of the sound source 3.

In another method of applying the invention, the pipe section 4 is made wholly or partly of a material which is partially compliant. Two ways of doing this are shown in and will be described with reference to FIGS. 4 and 5 of the drawings. It might, for example, be made of suitable plastics materials or of rubber, which may be reinforced by wire or other means. Preferably the pipe section 4 is so constructed that its compliance varies along its length in a manner which is calculated to produce the optimum magnitude and form the pulse which is radiated. By using this feature of the invention, it is possible to ensure that most of the energy is radiated from the pipe section 4 and little remains for radiation from the velocity transformer 7.

The variations of compliance in the pipe section 4 and also the design of the velocity transformer 7, which may also be made wholly or partly of a material which is partially compliant, can be calculated so as to minimise unwanted reflections or rarefactions of water in them.

When the valve 5 is closed to produce the desired compression on its inlet side, within the pipe section 4, a rare fraction will be produced on the outlet side of the valve in the pipe section 6. The immediate radiation of this rarefraction may be largely prevented, or at least reduced, by the use of a substantially noncompliant material for at least part of the pipe section 6 and by a suitable calcualtion of the length of this section and of the dimensions and design of the velocity transformer 8. These calculations can be manipulated to minimise the radiation of the rarefaction or to achieve a smearing or spread of the radiated rarefaction overtime. In particular these factors may be adjusted to obtain a base-reflex action with the radiation of positive and negative pulses from separated radiating areas and a pattern of reinforcement and cancellation in selected directions of radiation.

The velocity transformer 7, and also the transformer 8, may be generally conical in shape, as shown in FIG. 1, or they could be of exponential form with a view to minimising back reflections along the pipe sections 4 and 6. In any case the transformers 7 and 8 can be designed to reduce drag effects which would otherwise be produced in the water, particularly by turbulence when the water is leaving the transformer 8.

The valve 5 should be of a fast acting type which can be remotely controlled from the vessel 1. It should have a closure time which is less than the travel time of the compression head along the pipe section 4, which will be determined by the water hammer velocity and by the length of this section. The closure time of the valve also enters into the calculation of variations in compliance along the pipe section 4.

Particularly if the valve 5 is one in which the flow of water produces or assists in the rapid closure of the valve, in which case the closing of the valve may be effected simply by a trigger action operated from the vessel 1, provision may be made for releasing or running out the tow line at the vessel after a pulse has been produced, in order to allow the sound source 3 to come to rest in the water whilst the valve is being reset to its open position. This could be done in a manner similar to that which is sometimes employed for hydrophone arrays. Such running out of the towline could also be allowed for with other types of valve.

As an alternative to using a mechanical valve other means could be employed for momentarily checking the waterflow through the pipe 4. One such means is the injection of air under high pressure into the pipe, which could be done by using a suitable air gun or by an arrangement of jets. One method of doing this will be described with reference to FIG. 6.

Very considerable forces are generated in the underwater sound sources of the invention and precautions are necessary, both in their construction and use, to prevent loss of or damage to the sound source when it is used. The valve 5 in particular must be of very robust construction, as must be the connections between the valve unit and the pipe sections 4 and 6 and between these sections and the velocity transformers 7 and 8. Wire ropes or other strengthening means may be provided inside and/or outside the sections 4 and 6 to take the strains between the various parts of the sound source and the tow points on it, whilst the depressor 2 must also be very robust, since its motion cushions the sudden increase of drag on the two point on the vessel 1 which is produced when the valve 5 closes.

Figure 2:
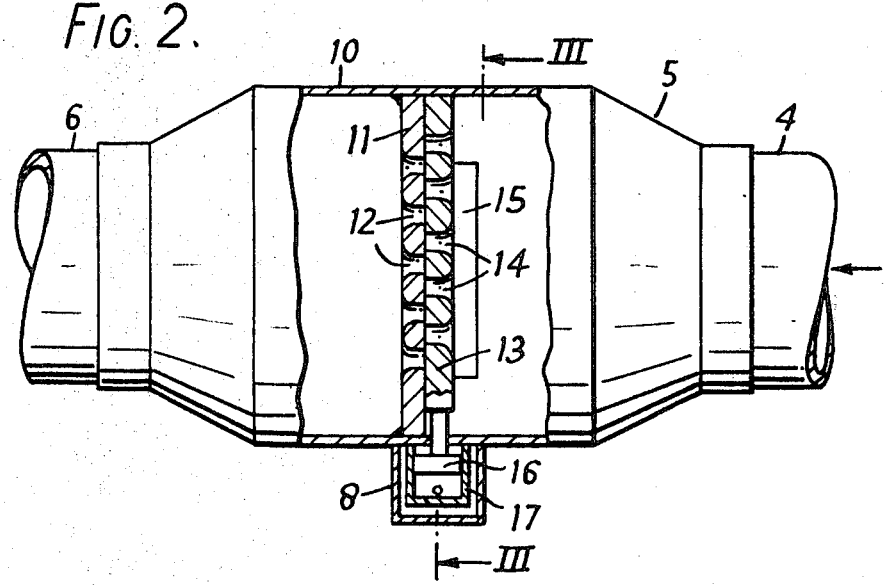
FIG. 2 is a view, partly broken-away and in section and to a larger scale, showing diagrammatically part of the sound source shown in FIG. 1.
Figure 3:
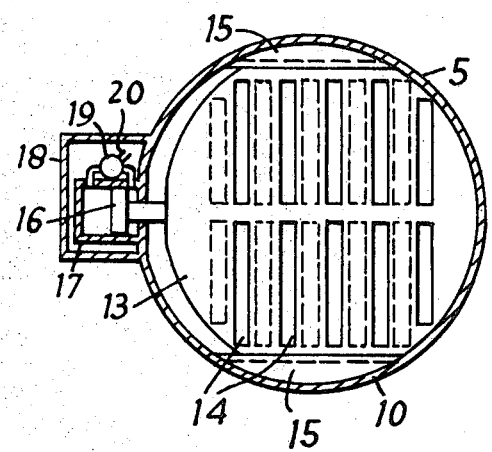
FIG. 3 is a cross section taken on the line III–III of FIG. 2.

Referring now to FIGS. 2 and 3, these illustrate, somewhat schematically, one type of cutoff valve unit 5 which may be used, it being understood that the parts are not necessarily shown to scale.

The unit 5 comprises a casing 10 which is connected between the ends of the two pipe sections 4 and 6 of the sound source 3 (FIG. 1). The casing 10 will normally be made of steel and may include internal reinforcements (not shown), since it will be subject to considerable stresses when in use.

Extending across the inside of the casing 10 is a dividing wall or plate 11 which forms a fixed part of the cutoff valve the closing of which stops the flow of water through the sound source 3 and causes the latter to produce the required underwater pulse or signal. Before this valve is closed water can pass through the plate 11, which is formed with a pattern of slots 12 for this purpose.

The cutoff valve also includes a movable valve plate 13 formed with a pattern of slots 14 which is similar to that of the slots 12. This plate 13 is slidably mounted within the casing 10 against the fixed plate 11 on the upstream side of the latter. It is slidably held against the plate 11 by suitable guides, which are indicated diagrammatically at 15, and it can be moved from its open position, in which the slots 14 register with the slots 12, to its closed position (as shown), and vice versa to open the valve, by means of a double-acting piston 16 which operates in a cylinder 17. This cylinder is shown as being mounted in a separate casing 18 secured to the outside of the casing 10, but it would be possible for the cylinder 17 with its piston to be arranged within the casing 10.

The piston 16 can be operated to open or close the cutoff valve by fluid (preferably hydraulic) pressure under the control of a two-way valve, which is indicated generally at 19. The inlet 20 of this valve may be connected by means of a pipe (not shown) to a source of pressure fluid on the vessel 1 and the operation of the valve may be controlled from the vessel by electric, hydraulic or other means.

Although only a few slots 12 and 14 have been shown in the drawings, it will be understood that in practice there may be a considerably larger number of such slots and that their shape and dimensions may be different to those shown, the object being to ensure that the cutoff valve, whilst having the strength which is necessary for it to withstand the heavy and sudden stresses which are produced when it closes, will still offer the least practical resistance to the flow of water through the unit 3 when the valve is open. This means that the slots 12 and 14 should extend over as great a part of the areas of the plates 11 and 13 as is practically possible and that the widths of the slots should only be slightly less than that of the parts of the plates 11 and 13 between the slots.

The free flow of water through the valve when it is open can be assisted and the production of eddies or other disturbances in the water can be reduced by making the slots 12 and 14 of exponential or aerofoil section.

Instead of using a sliding valve plate 13, this could be replaced by a rotatably mounted plate, in which case a radial arrangement of slots or openings would be used, in place of the slots 12 and 14.

Other types of cutoff valve which may be used include valves of the flapper or butterfly type. These may be arranged so that they are normally held open by suitable catch means, which are provided in the cutoff unit 5 but which can be operated from the vessel 1 to release the valve and allow the latter to close when it is desired to generate an underwater signal. The closing of the valve may be effected solely, or at least partly, by the pressure of the water which is produced in the pipe section 4 when the device is being towed through the water. Suitable means, which might be operated electrically, hydraulically or pneumatically, would then be provided for opening the valve.

Figure 4:
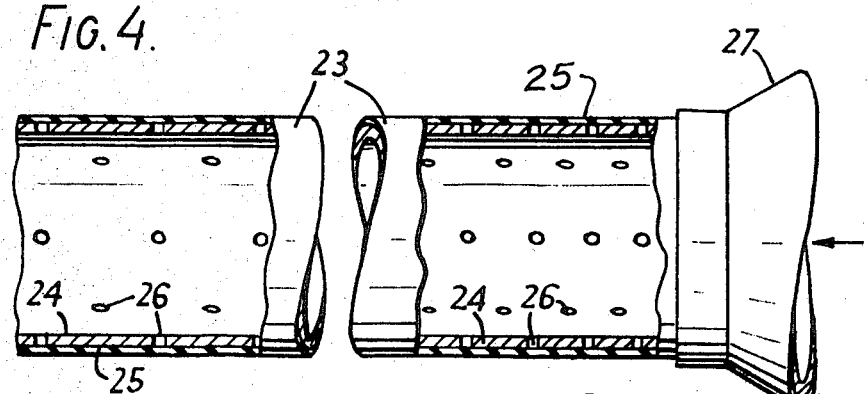
FIG. 4 is a view, partly broken-away and in section, showing parts of a sound source of a somewhat different construction.

FIG. 4 show, at 21 and 22, parts of the front pipe section 23 of a sound source, which is generally similar to that shown at 3 in FIG. 1 except that the special construction of the pipe section 23 gives it a degree of compliance which can be arranged to vary along the length of the pipe section. The nature and amount of this variation are so calculated as to obtain from the second source the type of signal which is required with a minimum of unwanted effects.

The pipe section 23 comprises an inner length of metal (steel) tube 24, which is substantially rigid and noncompliant and which possesses the necessary strength and rigidity. Surrounding this is an outer tube 25 which is made of an elastomeric material, such as a synthetic rubber. The inner tube 24 is formed with a pattern of holes 26. The effect of these is that when the cutoff valve of the sound source closes and produces a pressure wave which is transmitted back along the pipe section 23 towards the front velocity transformer, a part of which is shown at 27 in FIG. 4. the pressure rise causes water to be forced out through the holes 26, with a momentary expansion of the outer tube 25. The pipe section 23 is, therefore, in effect partially compliant.

The number, sizes and spacings of the holes 26 determine the degree of compliance of the pipe section 23. As shown in FIG. 4 the holes 26 may be spaced progressively more closely together, the nearer they approach the front velocity transformer 27, than they are at the other end of the pipe section 23 where it joins the cutoff valve. This allows for and takes into account the fact that the magnitude of a pressure pulse will decrease progressively from the cutoff valve as it travels towards the front velocity transformer 27.

Figure 5:
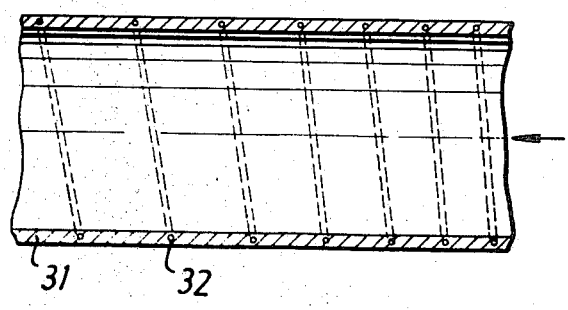
FIG. 5 is a detail sectional view which is similar to FIG. 4 but which shows yet another form of construction which may be used.

FIG 5 shows, very diagrammatically and in section, a pipe section 31 which is formed principally of an elastomeric material, which may be in one or more layers and which includes a relatively noncompliant reinforcement. This reinforcement is shown as a spiral of metal wire 32, although the reinforcement could be arranged in may other ways.

As is shown by the closer spacing of the turns of the wires 32 towards the forward end of the pipe section 31, the nature and distribution of the reinforcement may be designed to produce any desired pattern of compliance along the pipe section 31. With the arrangement shown in FIG. 5 the compliance will decrease towards the front end of the pipe section, away from the cutoff valve, as was the case with the construction shown in FIG. 4.

As an alternative to using a mechanical valve, other means could be employed for momentarily checking the flow of water through the front pipe section (the section 4 of FIG. 1). One such means is the injection of high pressure air into the pipe of the sound source and one method of doing this is shown diagrammatically in FIG. 6.

Figure 6:
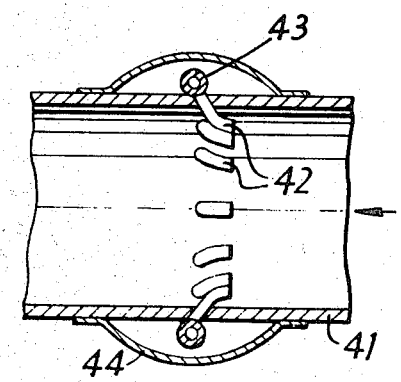
FIG. 6 is a detail sectional view showing, very diagrammatically, part of another sound source which exemplifies the invention.

In this particular arrangement the two pipe sections 4 and 6 of FIG. 1 are replaced by a single length of pipe, part of which is shown at 41. The ends of this are fitted with velocity transformers corresponding to the transformers 7 and 8. In the construction of FIG. 6 there is no cutoff valve, as such, but instead the pipe 41 is fitted with a number of nozzles 42 which are distributed around it and which lead into it from an outer annular supply pipe 43. This pipe 43 surrounds the pipe 41 and is shown as being protected by an outer casing 44.

The supply pipe 43 is connected, through a suitable valve (not shown) with a source of high pressure air, which latter could be in the survey vessel 1 or could be provided by one or more air cylinders mounted in any convenient place on or connected with the sound source.

To use this type of sound source it is towed through the water and, when it is desired to generate an acoustic pulse, high pressure air is injected through the nozzles 42 into the pipe 41, which it enters in a direction against that of the flow of water. This produces a sudden, but short-timed, interruption of the flow of water in the pipe 41 and, as a result, a pressure pulse is transmitted back up the pipe towards its front end.

Instead of using a separate sound source which is towed behind the survey vessel, it would be possible to attach the sound source to the hull of the vessel. This may be done in a number of ways.

By way of example, FIG. 7 shows two sound sources 51 and 52 which are attached to the opposite sides of the hull of a survey vessel 53.

It would also be possible to construct the survey vessel with one or more sound sources included within its hull, the front and rear ends of each sound source opening into the sea at points near the bow and stern, respectively, of the vessel. At these points the construction would include suitable velocity transformers.

FIG. 8 shows another construction in which a sound source 61 (which may be similar to the sound source 3 of FIG. 1) is attached to or suspended from a craft 62 which is towed by the survey vessel (not shown). The craft 62 is shown as being in the form of a catamaran, although it could take the form of a barge or raft, to give two other examples. The sound source 61 could either be suspended beneath the craft 62 by cables or the like or it could be rigidly connected to and form part of the structure of this craft.

The sound sources which have been described suffer from the fact that the closing of the cutoff valve produces very great stresses both in the sound source itself and also in the vessel to which it is connected or of which it forms a part. One method of substantially reducing this difficulty is shown, purely diagrammatically, in FIG. 9.

In this case the front pipe section 4 of FIG. 1 is replaced by two pipe sections 71 and 72, each of which terminates in a forwardly facing velocity transformer 73 or 74, respectively. The two sections 71 and 72 which are arranged in line with each other, meet at 75, where they are connected with a cutoff valve unit 76, which corresponds to the unit 5 of FIG. 1. From this cutoff unit 76 another pipe section 77 leads to a rearwardly facing velocity transformer 78, these last parts corresponding respectively to the pipe section 6 and velocity transformer 8 of FIG. 1.

When the sound source of FIG. 9 is travelling through the water and the valve in the cutoff unit 76 is suddenly closed, a plus will be produced in a manner similar to that which has been described. This will be transmitted back along both the pipe section 71 and 72 towards the forwardly facing velocity transformers 73 and 74, thereby generating an underwater signal which will be transmitted from the sound source. However, the fact that the water in the sound source the flow of which was cutoff by the closing of the cutoff valve 76 was travelling in opposite directions along the pipe sections 71 and 72 means that the reactionary forces produced by the stoppage of flow in these two sections will act in opposite directions, thus reducing the strain imposed on the towing gear and the survey vessel.

The sound source shown in FIG. 9 could be arranged to be towed in the water or it could be attached to or form part of the survey vessel or it could be attached to or form part of the construction of some other craft, such as the catamaran of FIG. 7, which is intended to be towed behind the survey vessel.

As has been mentioned above, the characteristics of the cutoff valve or other cutoff means used, the design and dimensions of the velocity transformers and the graded compliance of the various pipe sections may be used together to determine the effective waveform of the seismic signal which is emitted from the sound source and also its dependence on direction. Variations of the compliance of the front pipe section (or sections) in particular, allow either a sharp pulse to be radiated from the region close to the cutoff valve or a progressive radiation to be obtained along the length of the pipe. This progressive radiation, which is similar to that which may be obtained from an explosive line source, is produced by the head of the compression wave travelling along the pipe and it offers particular advantages; its production represents a valuable feature of the present invention. Although the velocity of the wave is relatively low, it makes useful array lengths possible. Control of the degree of compliance along the front pipe section enables this array to be tapered in accordance with principles which are well-known for other forms of seismic signal generation.

I Claim:

1. A sound source for generating underwater acoustic pulses, comprising an open-ended pipe having a leading and trailing end, which pipe is provided at at least one of its ends with a velocity transformer, such that when the pipe is made to travel through water beneath the surface of the latter with the leading end in the direction of motion oriented with said velocity transformer at the leading end of said pipe, the water enters this velocity transformer and flows along the pipe at a speed which is greater than the speed of the sound source through the water, and wherein the sound source includes cutoff means for suddenly interrupting the flow of water along the said pipe to produce an acoustic signal which is transmitted away from the said sound source.

2. A sound source according to claim 1, wherein the pipe is provided with a velocity transformer at both its leading and trailing ends, each said transformer being of funnel shape.

3. A sound source according to claim 1, wherein the said cutoff means comprises a valve which can be kept open while the sound source is travelling through the water and which can then be caused to close suddenly to interrupt the flow of water along the said pipe.

4. A sound source according to claim 1, wherein the cutoff means include means for injecting a gas under pressure into the said pipe.

5. A sound source according to claim 4, wherein the gas is injected into the pipe through one or more nozzles in a direction against the flow of water along the pipe.

6. A sound source according to claim 1, wherein the said pipe comprises front and rear pipe sections in front of and behind the said cutoff means oriented with respect to the direction of travel of said sound source, the front pipe section being longer than the rear pipe section.

7. A sound source according to claim 1, wherein the said pipe is made of a material such as a metal which is substantially noncompliant to pressure pulses produced in the pipe by the interruption of the flow of water along the pipe.

8. A sound source according to claim 1, wherein the said pipe is made at least partly of an elastomeric material, such as rubber or a synthetic plastic, which material is more compliant then metal to the pressure pulses.

9. A sound source according to claim 8, wherein the said pipe is so constructed that its compliance to pressure pulses varies along at least part of the length of the pipe away from the said cutoff means so as to control the waveform of the acoustic pulses which are radiated from the said sound source.

10. A sound source according to claim 9, wherein the compliance of the pipe progressively increases away from the cutoff means towards at least the leading end of the pipe.

11. A sound source according to claim 8, wherein the pipe comprises an inner tube made of a noncompliant material, such as metal, which is surrounded by an outer sheath made of a relatively compliant elastomeric material, such as rubber or a synthetic plastic, the inner tube being formed with a plurality of openings the number and size of which, together with the thickness properties of the outer sheath, control the compliance of the pipe along at least part of the length thereon.

12. A sound source according to claim 8, wherein the pipe is formed along at least part of its length of a reinforced elastomeric material, the nature and distribution of the reinforcement, together with the material used for the pipe and the thickness of its wall, controlling the distribution of the acoustic pulses which are radiated from the sound source.

13. A sound source according to claim 1 which is in the form of a substantially straight length of pipe with a velocity transformer at each of its ends, said sound source further comprising means for towing said pipe through the water beneath the surface of the latter by means of a towing vessel to produce the flow of water through the pipe.

14. A sound source according to claim 1, wherein the said pipe is operatively secured to the structure of a vessel.

15. A sound source according to claim 14, wherein the vessel is a powered vessel the engines of which drive the vessel and sound source through the water.

16. A sound source according to claim 1, wherein the said pipe has two inlets for the water, each provided with a velocity transformer, and has an outlet section which connects with the pipe between the said inlets, the said cutoff means being located between the discharge end of the said outlet section and the connection of the latter with the said pipe.

17. A sound source for generating underwater acoustic pulses, comprising an open-ended pipe having a leading and trailing end, which pipe is provided at at lease one of its ends with a velocity transformer, said pipe being adapted to be moved through a body of water beneath the surface of the latter with the leading end in the direction of motion, the velocity of the water flow through the pipe being increased over the velocity of movement of the pipe through the body of water by the velocity transformer so that flow through the pipe is at a speed greater than the speed of the sound source through the body of water, said sound source including cutoff means for suddenly interrupting the flow of water through said pipe to produce an acoustic signal which is transmitted away from said sound source.

18. A sound source according to claim 17 wherein said velocity transformer is generally funnel-shaped, and wherein said velocity transformer opens outwardly away from said pipe.